US012781800B2

(12) United States Patent
Sabogal et al.

(10) Patent No.: US 12,781,800 B2
(45) Date of Patent: Nov. 3, 2026

(54) BEARING SYSTEM COMPRISING A DEVICE FOR INTRODUCING AN INERT GAS IN THE BEARING CHAMBER

(71) Applicant: AKTIEBOLAGET SKF, Gothenburg (SE)

(72) Inventors: Gustavo Sabogal, IJsselstein (NL); Mikael Holgerson, Landvetter (SE); Fredrik Reinholdsson, Nödinge (SE); Pieter Martin Lugt, Vianen (NL); Nicola De Laurentis, Houten (NL); Frank Fiddelaers, Gorinchem (NL); Cornelis Harm Taal, Utrecht (NL); Frank Berens, Saunay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 98 days.

(21) Appl. No.: 18/791,672

(22) Filed: Aug. 1, 2024

(65) Prior Publication Data

US 2025/0075737 A1 Mar. 6, 2025

(30) Foreign Application Priority Data

Sep. 5, 2023 (DE) ......................... 102023208526.7

(51) Int. Cl.

| | |
|---|---|
| ***F16C 19/38*** | (2006.01) |
| ***F16C 33/66*** | (2006.01) |
| ***F16C 33/78*** | (2006.01) |
| *C10N 10/02* | (2006.01) |
| *C10N 10/04* | (2006.01) |
| *C10N 40/02* | (2006.01) |
| *C10N 50/10* | (2006.01) |

(52) U.S. Cl.

CPC .......... *F16C 33/6607* (2013.01); *F16C 19/38* (2013.01); *F16C 33/7886* (2013.01); *C10N 2010/02* (2013.01); *C10N 2010/04* (2013.01); *C10N 2040/02* (2013.01); *C10N 2050/10* (2013.01); *F16N 2210/14* (2013.01)

(58) Field of Classification Search

CPC ................ F16C 19/386; F16C 33/6607; F16C 33/6622; F16C 33/664; F16C 33/7886; F16C 19/38; C10N 2010/02; C10N 2010/04; C10N 2040/02; C10N 2050/10; F16N 2210/14

See application file for complete search history.

(56) References Cited

U.S. PATENT DOCUMENTS 3,008,343 A * 11/1961 Wasley .................. F16C 33/76 474/144
2011/0306429 A1 * 12/2011 Mikami ................ F16C 33/104 464/7

(Continued)

FOREIGN PATENT DOCUMENTS

WO WO-2005038332 A2 * 4/2005 .......... F16C 33/6622

*Primary Examiner* — Phillip A Johnson
(74) *Attorney, Agent, or Firm* — J-TEK LAW PLLC; Scott T. Wakeman; Mark A. Ussai

(57) ABSTRACT

A bearing system includes a housing having an interior that is configured to contain a quantity of grease or oil, a bearing mounted in the interior of the housing, and a system for introducing an inert gas into the interior of the housing. The inert gas is preferably substantially oxygen free so as not to oxidize the grease or oil.

14 Claims, 2 Drawing Sheets

(56) References Cited

U.S. PATENT DOCUMENTS

| | | | | |
|---|---|---|---|---|
| 2013/0174574 A1* | 7/2013 | Heaton | F02C 7/277 60/785 |
| 2014/0235515 A1* | 8/2014 | Foret | C10M 171/005 508/154 |

* cited by examiner

BEARING SYSTEM COMPRISING A DEVICE FOR INTRODUCING AN INERT GAS IN THE BEARING CHAMBER

CROSS-REFERENCE

This application claims priority to German patent application no. 10 2023 208 526.7 filed on DATE, the contents of which are fully incorporated herein by reference.

TECHNOLOGICAL FIELD

The present disclosure is directed to increasing the lifetime of greases or oils used in machine lubrication and more specifically to decreasing oxidation of greases or oils used in a bearing system.

BACKGROUND

A bearing system generally comprises a bearing and a housing positioned around the bearing. The bearing is for example destined to be positioned around a shaft.

The housing forms an inner sealed chamber around the bearing. The chamber is generally adapted to contain grease or oil and may be referred to as a "rolling chamber." The grease or oil lubricates the bearing and also helps to prevent the intrusion of dust, particles, water, etc. into the bearing. However, the chamber is generally not entirely filled with grease or oil. Some air is also present in the chamber and the oxygen in the air causes the oxidation of the grease or the oil. The oxidation affects the properties of the grease or the oil and reduces the quality of the grease or the oil and may shorten the lifetime of the grease or the oil.

A known solution to the problem of oxidation is to add fresh grease regularly in order to renew the properties and maintain a sufficient quality of grease. However, this solution needs a regular follow up of the grease and a significant amount of grease to satisfy the previous need.

Alternatively, certain types of grease or oil, for example fluorinated oils and greases, are less sensitive to oxidation and could be used in the bearing system. However, these greases are expensive and polluting. They also might face restrictions in the future.

SUMMARY

There is thus a need to provide a simple solution to the oxidation of the grease in a bearing system.

One aspect of the present disclosure is to provide a bearing system comprising a bearing configured to be positioned around a shaft, a housing positioned around the bearing and configured to form an inner sealed chamber between the shaft and the housing and adapted to contain grease in the chamber, wherein the bearing system comprises a device for introducing an inert gas in the chamber formed by the housing.

Thus, this bearing system is a simple way to reduce oxidation in the chamber by replacing air, which contains oxygen, with an inert gas that is substantially free of oxygen and which therefore does not oxidize the grease. As used herein, "substantially free of oxygen" is intended to mean a gas that contains either no oxygen or such a small amount of oxygen that it does not cause any problematic oxidation of the grease. This solution is not as expensive as high-quality and/or specialized greases or as refilling grease in the chamber and permits the lifetime of the grease or oil to be increased.

In one embodiment, the device comprises a gas line passing through the housing for introducing the inert gas from outside the housing to the chamber.

Advantageously, the housing comprises at least two seals positioned between the shaft and the housing in order to delimit the sealed chamber.

Advantageously, the device may an inert gas filter. In one embodiment, the inert gas filter comprises a pressurized air inlet, a device for filtering an inert gas among the components of the pressurized air, and a pump to maintain a constant pressure of inert gas in the chamber.

In another embodiment, the device may comprise an inert gas container. Advantageously, the container comprises a battery, a tank configured to hold an inert gas, and means for injecting the inert gas in the chamber, the means being powered by the battery.

Advantageously, the inert gas comprises nitrogen and/or carbon dioxide and/or argon and/or helium and/or krypton and/or xenon and/or neon, preferably nitrogen and/or carbon dioxide, more preferably nitrogen.

Generally, the phrase "inert gas" is intended to mean any gas having chemical properties similar to an inert gas, such as $CO_2$, that is a gas that will not react with grease or oil or will not oxidize the grease or oil.

Advantageously, the grease configured to be contained in the chamber is a mineral grease, preferably containing calcium or lithium.

Another aspect of the disclosure is a method comprising introducing an inert gas into the chamber of the bearing system, preferably carbon dioxide and/or nitrogen, more preferably nitrogen.

BRIEF DESCRIPTION

Other advantages and features of the invention will appear from the detailed description of an embodiment of the invention, which is a non-limiting example, illustrated in the appended drawings of which:

DETAILED DESCRIPTION

Figure 1:
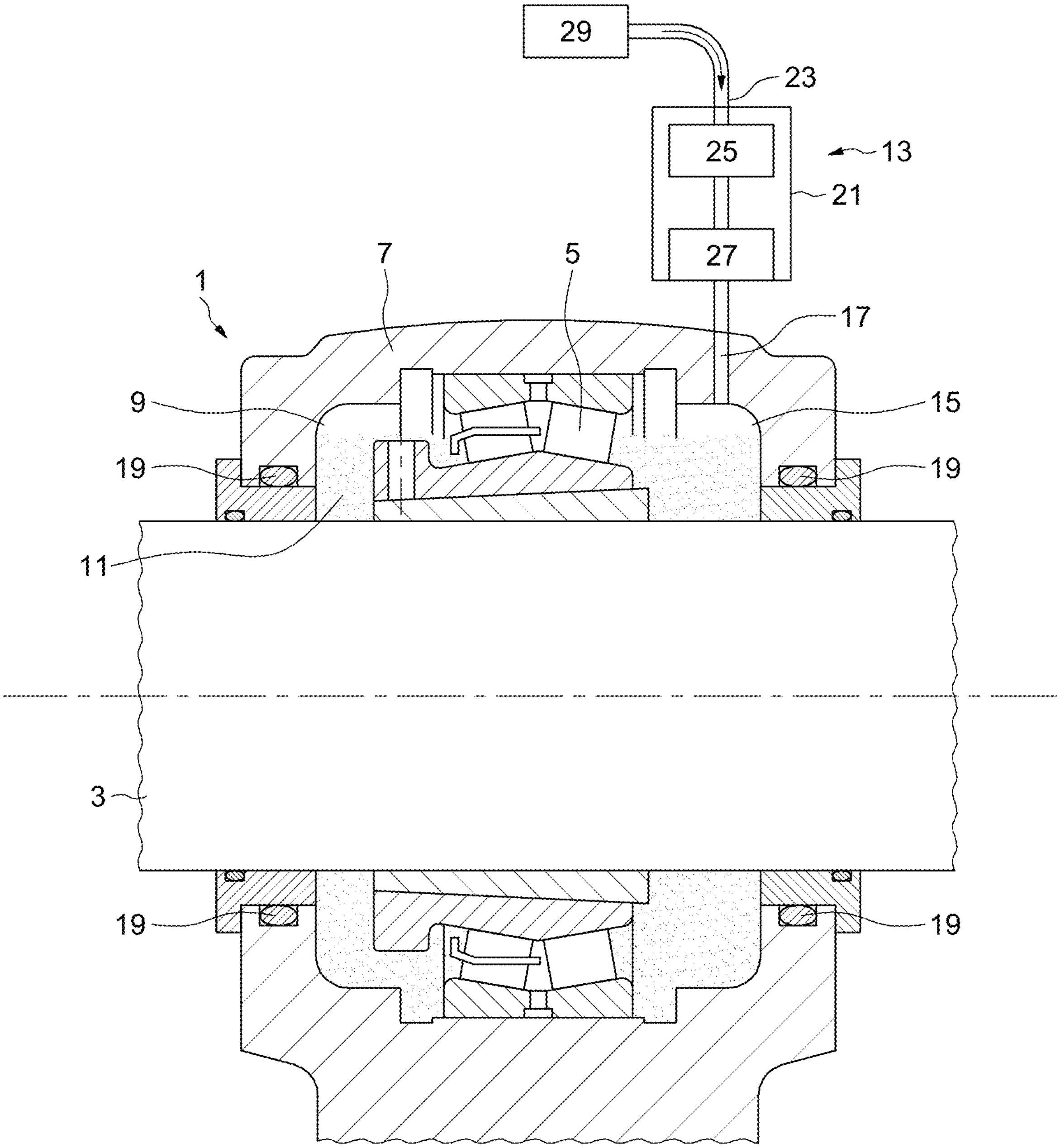
FIG. 1 is a schematic representation of a first embodiment of a bearing system according to an embodiment of the invention.

FIG. 1 shows a bearing system 1 and a shaft 3, the bearing system 1 comprising a bearing 5 positioned around the shaft 3, and a housing 7 positioned around the bearing 5. The bearing comprises an inner ring, an outer ring and at least one row of rolling elements radially disposed between the rings. Alternatively, the bearing may not include the row of rolling elements. In the illustrated example, the inner ring of the bearing 5 is mounted on the shaft 3 and the outer ring radially contacts the housing 7.

The housing 7 is configured to form an inner sealed chamber 9 between the shaft 3 and the housing 7 and is adapted to contain grease or oil 11 in the chamber 9. The bearing 5 is thus fully positioned in the chamber 9.

The bearing system 1 also comprises a device 13 for introducing an inert gas 15 into the chamber 9. For the purpose of this disclosure, the term "inert gas" includes non-reactive gases such as nitrogen and carbon dioxide that do not oxidize grease or oil. That is, a gas is "inert" if it does not oxidize or otherwise react with the grease or oil in a manner that adversely affects the properties of the grease or oil even if the gas itself, like carbon dioxide, includes oxygen molecules. Therefore, as used herein, the term "inert" includes non-reactive gases like nitrogen and carbon dioxide as well as gases such as helium, neon, argon, krypton and xenon that are generally considered to be "inert." Filling a bearing housing with such non-reactive and/or inert gases is preferably done in a manner that removes substantially all ambient air and thus substantially all oxygen from the housing so that substantially no oxygen is available to oxidize the grease.

Advantageously, the inert gas 15 to be introduced in the chamber 9 comprises nitrogen and/or carbon dioxide and/or argon and/or helium and/or krypton and/or xenon and/or neon, preferably nitrogen and/or carbon dioxide, more preferably nitrogen, as it is a very common gas that makes up a large present of air.

The grease 11 is advantageously a mineral grease, preferably a grease containing calcium or lithium. Providing an inert gas in the chamber 9 will significantly reduce the oxidation of such greases as compared to when the chamber 9 is filled with air.

Advantageously, the device 13 comprises a gas line 17 passing through the thickness of the housing 7 that is configured to introduce the inert gas 15 from outside the housing 7 into the chamber 9. Thus, there is no need to open the chamber 9 in order to introduce the inert gas 15, thus reducing the risk of oxidation of the grease 11.

The housing 7 comprises at least two seals 19 positioned between the shaft 3 and the housing 7 in order to axially delimit the sealed chamber 9. The seals 19 make, in addition of the grease 11, an additional barrier to dust, particles, water, and to air, reducing the oxidation mechanism. They also help to maintain the grease 11 in the chamber 9.

In this embodiment, the device 13 comprises an inert gas filter 21. As an example, the inert gas filter 21 comprises a pressurized air inlet 23, a device 25 for filtering an inert gas 15 from the other components of the pressurized air, and a pump 27 to inject and maintain a constant pressure of the inert gas 15 in the chamber 9. The inert gas filter 25 may filter air in order to extract nitrogen as an inert gas and finally to introduce the nitrogen into the chamber 9.

The device 13 may comprise a pressurized air supply 29, for example an air compressor or a pressurized air container.

Figure 2:
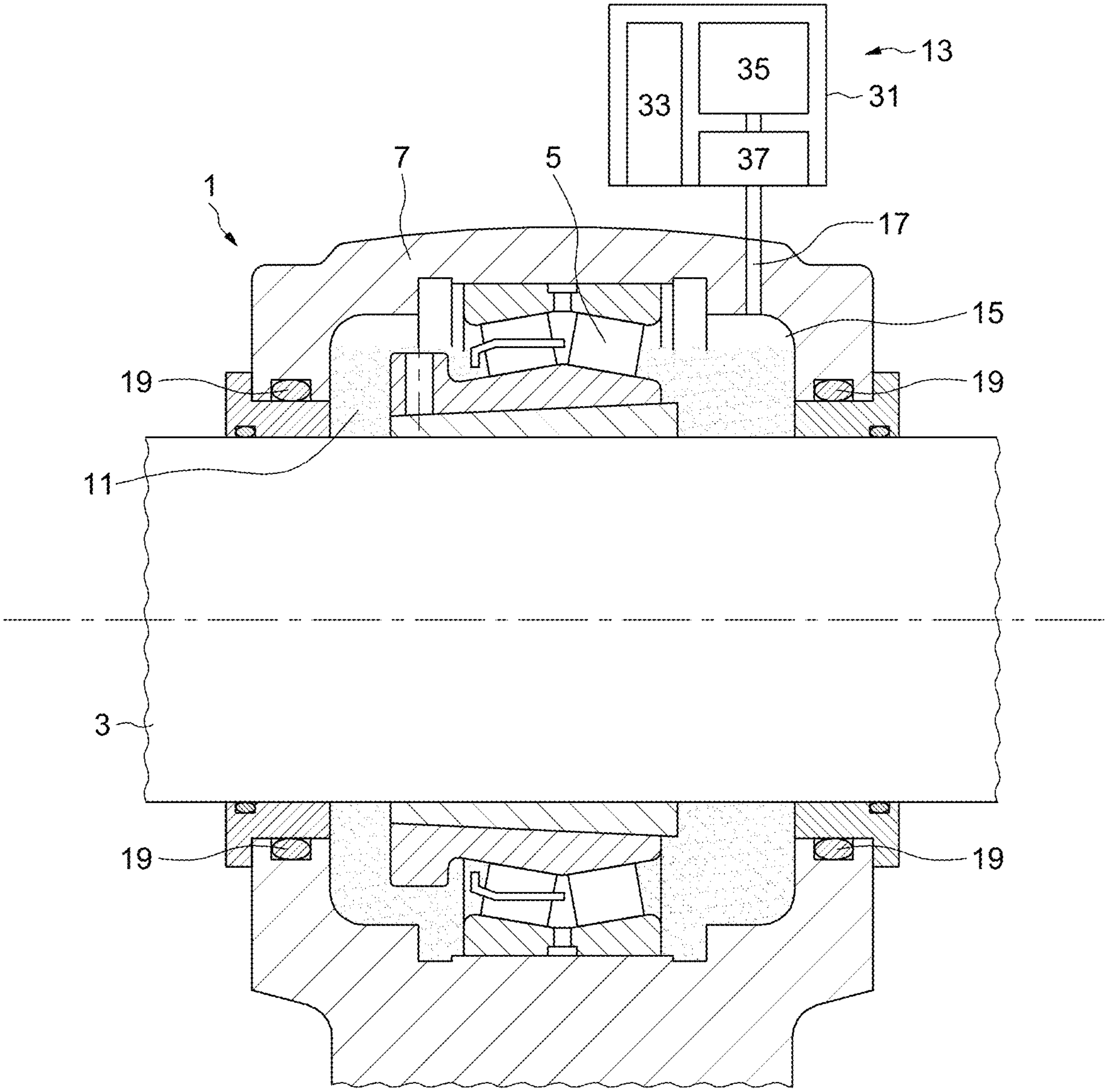
FIG. 2 is a schematic representation of a second embodiment of a bearing system according to an embodiment of the invention.

FIG. 2 shows a second embodiment of the bearing system 1 similar to the first embodiment, except that in the second embodiment the device 13 for introducing an inert gas 15 in the chamber 9 comprises an inert gas container 31 rather than an inert gas filter. The inert gas container 31 is fluidly linked to the chamber 9 by the gas line 17.

In this embodiment, the container 31 is initially filled with an inert gas 15 and must be changed or refilled regularly if a loss of the inert gas 15 is noticed, for example if the pressure in the chamber 9 decreases.

Advantageously, the container 31 comprises a battery 33, a tank 35 configured to stock an inert gas 15, and means 37 for injecting the inert gas 15 in the chamber 9, the means 37 being powered by the battery 33.

The means 37 for injecting the inert gas 15 may comprise a pump to maintain a constant pressure of inert gas in the chamber 9. The tank 35 of the container 31 may contain the inert gas under pressure in gaseous or liquid form and have a capacity of between 0.1 liter and 5 liters.

A similar container 31 containing grease may be used in parallel in order to refill the chamber 9 with grease 11 if a loss of grease is noticed.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing system comprising:

a housing having a sealed interior from which substantially all ambient air has been removed;

a bearing mounted in the interior of the housing, the housing being configured to contain a quantity of grease or oil; and means for introducing an inert gas into the interior of the housing.

2. The bearing system according to claim 1, wherein the means for introducing the inert gas includes a gas line passing through the housing.

3. The bearing system according to claim 1, including a shaft extending through the housing and at least two seals positioned between the shaft and the housing, wherein an inner ring of the bearing is mounted on the shaft.

4. A bearing system comprising:

a housing having an interior;

a bearing mounted in the interior of the housing, the housing being configured to contain a quantity of grease or oil; and means for introducing an inert gas into the interior of the housing, wherein the means for introducing the inert gas comprises an inert gas filter.

5. The bearing system according to claim 4, wherein the inert gas filter comprises a pressurized air inlet, a device for isolating an inert gas from the pressurized air, and a pump configured to maintain a constant pressure of the inert gas in the chamber.

6. The bearing system according to claim 4, wherein the inert gas filter is configured to separate the inert gas from ambient air.

7. The bearing system according to claim 1, wherein the means for introducing the inert gas comprises a pressurized container of the inert gas.

8. A bearing system comprising:

a housing having an interior;

a bearing mounted in the interior of the housing, the housing being configured to contain a quantity of grease or oil;

means for introducing an inert gas into the interior of the housing, and including a battery connected to the means for introducing the inert gas, the battery being configured to power the means for introducing the inert gas, wherein the means for introducing the inert gas comprises a pressurized container of the inert gas.

9. The bearing system according to claim 1, including:

a shaft extending through the housing and at least two seals positioned between the shaft and the housing, and the quantity of grease or oil filling a first portion of the interior of the housing, wherein an inner ring of the bearing is mounted on the shaft, wherein the inert gas is substantially oxygen free, and wherein a second portion of the housing interior is filled with the substantially oxygen-free inert gas.

10. The bearing system according to claim 9, wherein the inert gas comprises nitrogen and/or carbon dioxide and/or argon and/or helium and/or krypton and/or xenon and/or neon.

11. The bearing system according to claim 9, wherein the inert gas comprises nitrogen.

12. The bearing system according to claim 11, wherein the grease is a mineral grease comprising calcium or lithium.

13. The bearing system according to claim 9, wherein the means for introducing the inert gas comprises an inert gas filter configured to separate the inert gas from ambient air.

14. The bearing system according to claim 13, wherein an outer ring of the bearing is connected to an interior wall of the housing.

* * * * *